United States Patent Office 3,346,553
Patented Oct. 10, 1967

3,346,553
AZO-DYESTUFFS CONTAINING AMINOALKYL-
ENESULFONYLAMINO GROUPS
Rudolf Kuhne and Fritz Meininger, Frankfurt am Main,
Germany, and Rolf Pfirrmann, Lucerne, Switzerland,
assignors to Farbwerke Hoechst Aktiengesellschaft vormals Meister Lucius & Bruning, Frankfurt am Main,
Germany, a corporation of Germany
No Drawing. Filed Oct. 2, 1963, Ser. No. 313,156
Claims priority, application Germany, Oct. 3, 1962,
F 37,950
6 Claims. (Cl. 260—163)

The present invention relates to novel azo-dyestuffs and to a process for preparing them; more particularly it relates to azo-dyestuffs of the general formulae

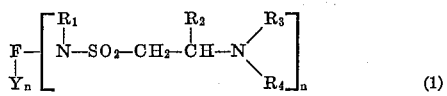

(1)

and

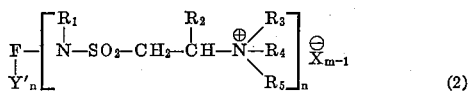

(2)

in which F represents the radical of a mono- or disazo-dyestuff molecule, $R_1$ and $R_2$ represent hydrogen atoms or lower alkyl groups, $R_3$, $R_4$ and $R_5$ represent hydrogen atoms, aliphatic, cycloaliphatic, aromatic or heterocyclic radicals, two or three of these radicals together with the nitrogen atom may belong to a heterocyclic ring, $X^\ominus$ represents an inorganic or organic acid radical, Y represents a hydrogen atom or the group —$SO_3H$ or —COOH, Y' represents a hydrogen atom or the group —$SO_3^\ominus$ or —$COO^\ominus$, n means an integer from 1 to 3 and m means an integer from 1 to 4, with the proviso that m stands for an integer from 2 to 4, when Y represents a hydrogen atom, and m stands for 1, when Y represents the group —$SO_3^\ominus$ or —$COO^\ominus$. Particularly suitable dyestuffs are those wherein F represents a monoazo or disazo dyestuff molecule containing at least one benzene ring and one naphthol or pyrazolone group, wherein the group shown within the brackets of the formulas (1) and (2) is connected to a benzene ring or naphthol group directly or by means of methylene, wherein $R_1$ and $R_2$ represent hydrogen or lower alkyl, $R_3$, $R_4$, and $R_5$ taken alone represent hydrogen, methyl, ethyl, or phenyl, $R_3$ and $R_4$ taken together represent pentamethylene, $R_3$, $R_4$, and $R_5$ taken together with the nitrogen atom represent pyridinium, $X^-$ represents chlorine, hydrogen sulfate, or methosulfate, Y represents —$SO_3H$ or —COOH, Y' represents —$SO_3H$, —$SO_3^-$, —COOH, or —$COO^-$, n represents 1 to 3, n' represents 0 to 3, and m represents 1 to 4.

It has been found that valuable novel azo-dyestuffs of the general formulae

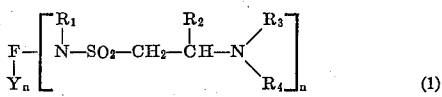

(1)

and

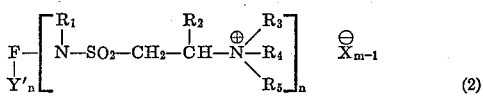

(2)

in which F represents the radical of a mono- or disazo-dyestuff molecule, $R_1$ and $R_2$ represent hydrogen atoms or lower alkyl groups, $R_3$, $R_4$ and $R_5$ represent hydrogen atoms, aliphatic, cyclo aliphatic, aromatic or heterocyclic radicals, two or three of these radicals together with the nitrogen atom may belong to a heterocyclic ring, $X^\ominus$ represents an inorganic or organic acid radical, Y represents a hydrogen atom or the group —$SO_3H$ or —COOH, Y' represents a hydrogen atom or the group —$SO_3^\ominus$ or —$COO^\ominus$, n means an integer from 1 to 3 and m means an integer from 1 to 4, with the proviso that m stands for an integer from 2 to 4, when Y represents a hydrogen atom, and m stands for 1, when Y represents the group —$SO_3^\ominus$ or —$COO^\ominus$, can be obtained by coupling aromatic diazo, diazoazo or tetrazo compounds with coupling components; at least one of the two components contains one or several groups of the formulae

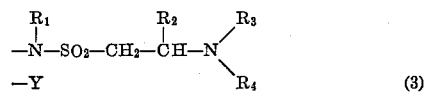

(3)

and

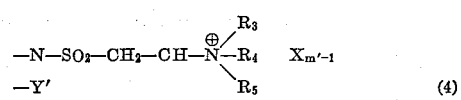

(4)

in which $R_1$, $R_2$, $R_3$, $R_4$, $R_5$, $X^\ominus$, Y and Y' are defined as above and m' stands for 1 or 2, with the proviso that m' stands for 1, when Y' represents the group —$SO_3^\ominus$ or —$COO^\ominus$, and m' stands for 2, when Y' represents a hydrogen atom.

In addition to one or several groups of the Formula 3 or 4 the azo-dyestuffs obtainable by the process of the present invention contain either no further substituent imparting solubility in water or, however, at least one group imparting solubility in water as, for example, a sulfonic acid amide group, a carboxylic acid group or, above all, a sulfonic acid group. These groups imparting solubility in water can be placed at choice in the dyestuff molecule. Dyestuffs the diazo component of which contains one or several groups of the Formula 3 or 4 can be prepared by diazotizing an aromatic amine containing at least one group of the Formula 3 or 4 with any compounds capable of coupling. The aromatic amines used as starting compounds containing at least one group of the formula

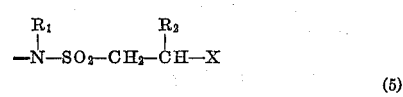

(5)

or

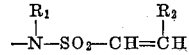

in which $R_1$ and $R_2$ represent a hydrogen atom or a lower alkyl radical and X represents an inorganic or organic acid radical, with ammonia, primary or secondary aliphatic, cycloaliphatic, aromatic or heterocyclic amines, treating the amines thus obtained, if desired, with alkylating agents or inorganic or organic acids and then reducing the nitro group of the compounds obtained, for example, by catalytic hydration. Diazotizable aromatic amines containing at least one quaternary ammonium group of the Formula 4 can be prepared by reacting aromatic nitro compounds containing at least one group of the Formula 5 with tertiary aliphatic, aromatic or heterocyclic amines and then reducing the nitro group of the quaternary ammonium compounds obtained to the amino group.

As suitable diazo components there may be mentioned, for example, the following compounds:

1-($\beta$-dimethylamino-ethylsulfonylamino)-4-amino-
   benzene,
1-(N-methyl-$\beta$-dimethylamino-ethylsulfonylamino)-
   4-aminobenzene,
1-(N-ethyl-$\beta$-diethylamino-ethylsulfonylamino)-
   4-aminobenzene, 1-(N-methyl-β-diethylamino-ethylsulfonylamino)-
4-aminobenzene,
1-(β-diethylamino-ethyl-sulfonylamino)-
4-aminobenzene,
1-(N-methyl-β-dimethylamino-ethylsulfonylamino)-
4-chloro-3-aminobenzene,
1-(β-diethylamino-ethylsulfonylamino)-4-chloro-
3-aminobenzene,
1-(β-piperidyl-ethyl-sulfonylamino)-4-aminobenzene,
1-(β-dimethylamino-ethylsulfonylamino)-2,5-dimethyl-
4-aminobenzene,
1-(N-methyl-β-dimethylamino-ethylsulfonylamino)-
2,5-dimethyl-4-aminobenzene,
1-(β-dimethylamino-ethylsulfonylamino)-2-methyl-
5-methoxy-4-aminobenzene,
1-(β-dimethylamino-ethyl-sulfonylamino)-4-amino-
naphthalene,
1-(N-methylsulfonylamino-4'-aminophenyl)-ethane-
2-N-pyridinium chloride,
1-(sulfonylamino-4'-aminophenyl)-ethane-2-N-
pyridinium chloride,
1-(N-methylsulfonylamino-4'-aminophenyl)-ethane-
2-trimethylammoniummethyl sulfate,
1-(N-ethylsulfonylamino-4'-aminophenyl)-ethane-
2-N'-methylpiperidiniummethyl sulfate,
1-(N-ethylsulfonylamino-4'-aminophenyl)-ethane-
2-N'-methylpiperidiniummethyl iodide or 1-(N-ethyl-
sulfonylamino-4'-aminophenyl)-ethane-2-N'-methyl-
piperidiniummethyl-chloride,
1-(N-methylsulfonylamino-3'-amino-4'-chlorophenyl)-
ethane-2-diethylmethylammonium chloride and
1-(sulfonylamino-4'-amino-3'-sulfophenyl)-ethane-
2-trimethylammoniummethyl-sulfate.

As diazo components containing at least one group of
the Formula 3 or 4 there may also be used compounds
of the formulae

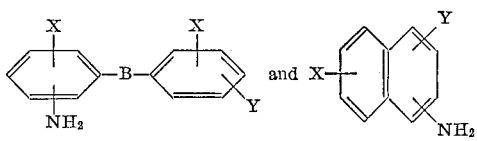

in which Y represents a group of the Formula 3 or 4, X
represents a hydrogen atom or any substituent, for example,
a halogen atom such as a chlorine atom, an
alkoxy group such as a methoxy or ethoxy group, an
alkyl or a sulfonic acid, a methylsulfone, a carboxylic
acid or a dialkylsulfonamide group and B represents a
direct linkage or a bridge member as, for example, an
ether, mercapto, sulfone, sulfonamide, carboxylic acid
amide, ketone or methylene group.

As coupling components containing one or several
groups of the Formula 3 or 4 there may be used, for
example, compounds of the benzene or naphthalene
series which, owing to the presence of an amino group
or an aromatically bound hydroxy group, are capable of
coupling, and ketomethylene compounds containing a
methylene group capable of coupling and standing in a
position adjacent to an enolizable keto group. These
coupling components can be prepared, for example, by
reacting compounds capable of coupling and containing
at least one group of the formula

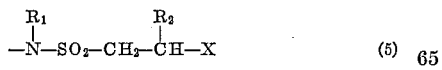

or

in which $R_1$ and $R_2$ represent a hydrogen atom or a lower
alkyl radical and X represents an inorganic or organic acid
radical, with ammonia, primary or secondary aliphatic,
cycloaliphatic, aromatic or heterocyclic amines. The
amines thus obtained which contain at least one group of
the Formula 3 may be treated, if desired, with alkylating
agents or inorganic or organic acids, thus obtaining coupling
components containing at least one group of the
Formula 4. The same compound is obtained by reacting
compounds capable of coupling and containing at least
one group of the Formula 5 with tertiary aliphatic, aromatic
or heterocyclic amines. There may be used, for example,
coupling components of the following formulae:

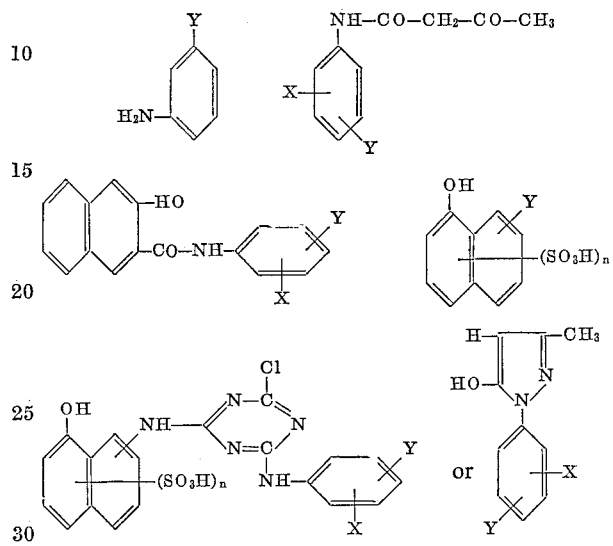

in which X and Y are defined as above and $n$ is 1 or 2.

As suitable coupling components there may be used,
for example, the following compounds:

1-(β-dimethylamino-ethylsulfonylamino)-3-dimethyl-
aminobenzene,
1-(N-methyl-β-dimethyl-aminoethylsulfonylamino)-3-
dimethylaminobenzene,
1-(β-dimethylaminoethylsulfonylamino)-8-hydroxy-
naphthalene-3,6-disulfonic acid,
1-(N-methyl-β-dimethylamino-ethylsulfonylamino)-
8-hydroxynaphthalene-3,6-disulfonic acid,
1-(N-methyl-β-diethylamino-ethylsulfonylamino)-8-
hydroxynaphthalene-3,6-disulfonic acid;

further appropriate coupling components are compounds
having the following structure:

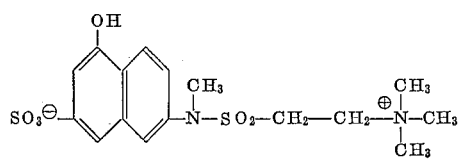

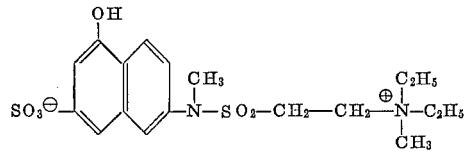

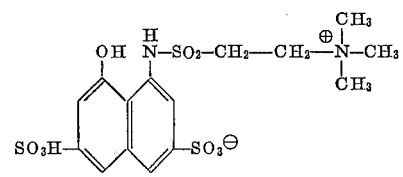

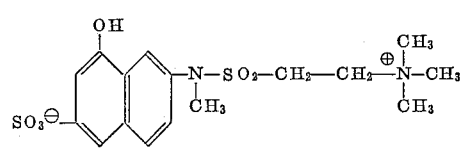

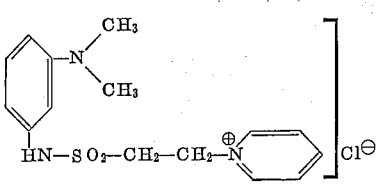

For preparing azo-dyestuffs containing in the diazo component and in the coupling component each at least one group of the Formula 3 or 4 the above-mentioned diazotizable arylamine derivatives are reacted with the above-indicated compounds capable of coupling—depending upon their composition—in an acid, neutral or alkaline solution, preferably at a pH-value as low as possible, in order to couple them sufficiently and to prevent secondary reactions. The azo-dyestuffs obtained are isolated from the medium in which they form at a pH-value from about 6 to 8.

For preparing those azo-dyestuffs obtainable by the process of the present invention and containing only in the diazo component at least one group of the Formula 3 or 4, the diazonium compounds of amines of the above-indicated constitution are coupled with any compounds capable of coupling which are free from groups of the Formulae 3 and 4 and contain advantageous groups imparting solubility in water as, for example, carboxylic acid or sulfonic acid groups. As examples of such coupling components there may be mentioned the following compounds: β-ketocarboxylic acid esters or β-ketocarboxylic acid amides which are capable of coupling in α-position, for example acetoacetic acid arylides, pyrazolones, especially 5-pyrazolones coupling in 4-position such as 3-methyl-5-pyrazolone, 1-phenyl-3-methyl-5-pyrazolone, 1-(2'-, 3'- or 4'-sulfophenyl)-3-methyl-5-pyrazolone, 2-phenyl-5-pyrazolone-3-carboxylic acid, 5-pyrazolone-3-carboxylic acid amides, 1-(5'-chloro-2'-methyl-4'-sulfophenyl)-3-methyl-5-pyrazolone, furthermore phenols and hydroxyquinolines, such as 8-hydroxyquinoline, salicylic acid, diaminobenzene-sulfonic acids such as 1,3-diaminobenzene-4-sulfonic acid, also α- or β- naphthols, α- or β-naphthyl-amines, above all, however, amino-, aminohydroxy- and hydroxynaphthalene-sulfonic acids or their N-alkyl, N-aryl or N-acyl derivatives, such as 1-hydroxy- or 2-hydroxy-naphthalene-monosulfonic acid or 1,8-dihydroxynaphthalene-3,6-disulfonic, acid, 2-aminonaphthalene-6-sulfonic acid, 1-amino-8-hydroxynaphthalene-2,4-, 3,6- or 4,6-disulfonic acid, and the acyl derivatives of amino-hydroxynaphthalene-sulfonic acid, such as 1-acetylamino- or 1-benzoylamino-8-hydroxy-naphthalene-3,6-disulfonic acid. Further coupling components entering into consideration are 2,3-hydroxy-naphthoic acid and 2,3-hydroxy-napthoic acid arylides or 2,3-hydroxy-carbazol-carboxylic acid arylides or 2-hydroxy-diphenylene-oxide-3-carboxylic acid arylides, the arylide group of which may carry any substituent, furthermore 5,5'-dihydroxy-2,2'-dinaphthyl-urea-7,7'-disulfonic acid which like the 1-amino-8-hydroxy-naphthalene-3,6-disulfonic acid may be coupled twice with the diazo components indicated, and furthermore, the condensation products of copper- or nickel-phthalocyanine-sulfochlorides and aminophenyl-methyl-pyrazolones or acyl-acetic acid arylamides containing amino groups (German specification 1,044,309). Coupling products containing primary amines containing, if desired, groups imparting solubility in water as, for example, sulfonic acid groups may be diazotized again and reacted with any coupling component to form diasazo-dyestuffs.

Finally, for preparing the azo-dyestuffs obtainable by the process of the present invention any diazo compound not containing a group of the Formula 3 or 4 can be coupled with coupling components which contain at least one of these groups.

It is of advantage to select such a diazotizable aromatic amine that the final dyestuff contains at least two groups imparting solubility in water per azo group, one of the groups imparting solubility in water possibly being an aromatically bound carboxylic acid or sulfonic acid group. Furthermore, these diazo compounds may either be simple compounds, such as aminobenzene derivatives, aminobenzene - sulfonic acid, aminonaphthalene-sulfonic acids, aminonaphthol-sulfonic acids or aminophenol-sulfonic acids or complicated diazotizable compounds containing, for example, one or two azo groups in the molecule.

As aromatic amines, the diazo compounds of which are suitable for coupling with the said coupling components substituted by groups of the Formula 3 or 4, there may be used, for example, the following compounds: aminobenzene, 2-, 3- or 4-methyl-1-aminobenzene, dimethyl-aminobenzenes, methoxyaminobenzenes, such as 4-methoxy-1-aminobenzene, mono- or polychloro-aminobenzenes, 1-aminobenzene-2-, 3- or 4-sulfonic acids, 4-chloro-5-methyl-1-aminobenzene - 6 - sulfonic acid, 1-aminobenzene-2,5-disulfonic acid, 4-methyl-1-aminobenzene-2-sulfonic acid, 2,5-dichloro-1-aminobenzene-4- sulfonic acid, aminobenzene-carboxylic acids, such as 1-aminobenzene-3-carboxylic acid, 4-aminodiphenyl, aminodiphenyl-sulfonic acids, such as 4-aminodiphenyl-3-sulfonic acid, aminonaphthalenes, such as 1-aminonaphthalene, aminonaphthalene-sulfonic acids, such as 1-aminonaphthalene-4-sulfonic acid or 1-aminonaphthalene-3,6,8-trisulfonic acid, 1,3 - phenylenediamine, aminohydroxy - carboxylic acids, aminodiphenyl ethers, aminodiphenylsulfone, dehydro-thiotoluidine, 4-amino-azobenzene-3'-sulfonic acid, 4,4'-diamino - diphenyl, 4,4'-diamino - 3,3' - dimethoxy-diphenyl or 4,4'-diamino-diphenylurea.

In spite of the presence of the labile groups of the Formula 3 or 4 the dyestuffs obtained according to the process of the present invention can be isolated and worked up into dry dyestuff preparations without loosing their valuable properties. The isolation is carried out at temperatures as low as possible by salting out and filtering or by evaporating the dyestuff solutions in vacuo. The drying is preferably carried out at temperatures which should not be too high, i.e., at 40° to 65° C., under reduced pressure.

The novel dyestuffs obtainable by the process of the present invention may be used for dyeing natural and synthetic textile materials such as, for example, cotton, viscose, regenerated cellulose, wool, silk, and fibers of cellulose acetate, polyamide, polyacryl-nitrile and aromatic polyesters. There are obtained fast, intense dyeings which are distinguished, above all, by a very good fastness to wet processing.

For dyeing textile materials of cellulose fibers there are particularly suitable, for example, those dyestuffs obtainable by the process of the present invention which contain groups imparting solubility in water, especially sulfonic acid or carboxylic acid groups. The water-soluble dyestuffs are applied on cellulose fibers by treating the material with an aqueous solution of the dyestuff at normal or elevated temperature in the presence of an acid-binding agent, such as sodium carbonate, sodium bicarbonate, trisodium phosphate or trichloroacetic acid sodium or with a printing paste with the addition of an acid-binding agent, the treatment with the acid-binding agent possibly being carried out during or after the application of the dyestuff, and by then heating or steaming them.

Furthermore, for dyeing textile materials containing cellulose there are especially suitable the dyestuffs obtainable by the process of the present invention which do not contain groups imparting solubility in water, such as sulfonic acid or carboxylic acid groups. Such dyestuffs are applied to the fiber according to the usual dyeing, padding or printing processes which, if desired, is after-treated with an acid-binding agent at room temperature or elevated temperature. These cationic dyestuffs are also suitable for dyeing wool and particularly suitable for dyeing synthetic fibers such as, for example, of acetate rayon, polyamides, polyesters and polyacryl-nitrile.

The following examples serve to illustrate the invention, but they are not intended to limit it thereto, the parts and percentages being by weight unless otherwise stated and the relationship of parts by weight to parts by volume being the same as that of the kilogram to the liter.

Example 1

26 parts of 1-(N-methyl-β-dimethylamino-ethylsulfonylamino)-4-aminobenzene of the formula

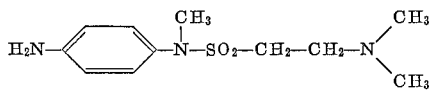

are dissolved in the cold in 150 parts by volume of water, 30 parts by volume of 5 N-hydrochloric acid are added and the whole is diazotized at about 0° to 5° C. When the diazotization is complete the pH-value of this solution is adjusted to about 6 to 6.5 with sodium bicarbonate or sodium acetate. The diazonium solution obtained is then combined with a solution of 56 parts of 1-naphthol-3,6-disulfonic acid of 55% strength in 200 parts by volume of water. Provisions are made that the reaction takes place at a pH-value of 4 to 5 by adding sodium bicarbonate or sodium acetate. When the coupling is complete, the dyestuff is salted out with sodium chloride, filtered off and dried in vacuo at about 50° C.

There is obtained a red powder which dissolves easily in water to give an orange-red solution and which when subsequently steamed in the presence of sodium bicarbonate yields a scarlet cotton print possessing a good fastness to light and to wet processing. When using as coupling component instead of 1-naphthol-3,6-disulfonic acid an equivalent amount of 1-phenyl-3-methypyrazolone, a dyestuff is obtained which dissolves in the hot in water and dyes polyester fibers a golden yellow shade according to the high-temperature process.

The 1 - (N-methyl-β-dimethylamino-ethylsulfonylamino)-4-aminobenzene used for preparing the dyestuffs can be prepared in the following manner:

287 parts of 1-(N-methyl - β - dimethylamino-ethylsulfonylamino)-4-nitrobenzene (obtainable by reacting 4-nitro-1-N-methylaminobenzene with carbyl sulfate and then with dimethyl amine) are dissolved in the heat in 1000 parts of alcohol and reduced at a temperature of about 20° to 30° C. in the presence of 40 parts of Raney nickel at a hydrogen pressure of 30 atmospheres gauge pressure. After the taking up of hydrogen, the solution obtained is filtered and evaporated in vacuo. After having recrystallized the residue from butanol, 240 parts of the product are obtained in the form of colorless crystals which melt at 127° to 128° C.

Example 2

42 parts of the aniline derivatives of the formula

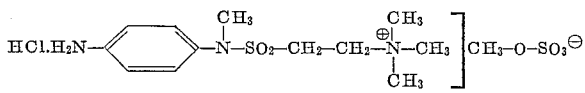

obtainable by catalytic reduction of 1-(N-methylsulfonylamino-4-nitrophenyl)-ethane - 2 - trimethyl-ammonium-methylsulfate and neutralization with hydrochloric acid (after recrystallization from methanol/ethyl acetate, melting point 177° C.) are diazotized at 0° to 5° C. in a mixture of 200 parts of ice water and 24 parts of concentrated hydrochloric acid with 20 parts by volume of a 5 N-sodium nitrite solution. When the diazotization is complete the pH-value is adjusted to 5 to 6 by adding sodium bicarbonate, and this diazonium salt solution is combined with the solution of 56 parts of 1-naphthol-3,6-disulfonic acid of 55% strength in 200 parts by volume of water. The acid, which liberates during the reaction, is neutralized with sodium bicarbonate. When the coupling is complete, the dyestuff formed is completely separated by introducing potassium chloride. The product is filtered off and dried in vacuo at about 50° C. A dark powder is obtained which possesses properties similar to those of the dyestuff described in Example 1.

When using instead of 1-naphthol-3,6-disulfonic acid 59 parts of 1-acetylamino-8-naphthol-3,6-disulfonic acid of 61% strength, there is obtained after the coupling and evaporating in vacuo of the red dyestuff solution at about 50° C. a dark powder which dissolves easily in water to give a bluish red solution. In the presence of an acid-binding agent, such as sodium carbonate or potassium bicarbonate, this dyestuff yields a brilliant, intense bluish red cotton print which possesses a very good fastness to wet processing. Furthermore, when using in the above Example instead of 1-naphthol-3,6-disulfonic acid an equivalent amount of 1-phenyl-3-methylpyrazolone as coupling component, a dyestuff is obtained which dissolves in water to give a yellow solution and dyes fibers of polyesters, polyamides and polyacrylo-nitrile golden yellow shades. The dyeings obtained possess good fastness properties, especially a good fastness to thermofixation.

In an analogous manner there are obtained the dyestuffs listed in the following table; depending on the pH-value of the solutions from which they are prepared, they can be obtained in the form of betaine or mineral acid salts. On cellulose materials, such as cotton, they yield dyeings and prints possessing a good fastness to wet processing.

| Ex. | Dyestuff | Tint on cotton |
|---|---|---|
| 3 | CH₃—CO—NH OH (naphthalene)—N=N—(phenyl)—N—SO₂—CH₂—CH₂—N⊕(CH₃)₃, with SO₃⁻ and SO₃H substituents | Red. |
| 4 | HOOC—(pyrazole with N-phenyl-CH₃, HO₃S, SO₃⁻)—OH, —N=N—(phenyl)—N—SO₂—CH₂—CH₂—N⊕(CH₃)₃ | Yellow. |

| Ex. | Dyestuff | Tint on cotton |
|---|---|---|
| 5 | 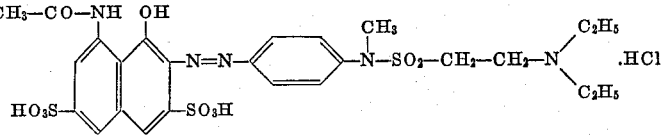 | Bluish-red. |
| 6 | 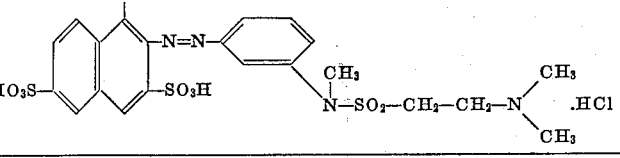 | Scarlet. |
| 7 | 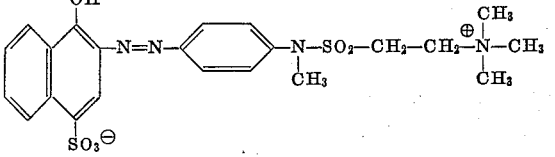 | Scarlet. |
| 8 | 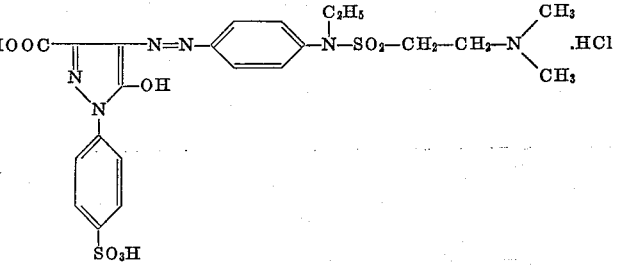 | Yellow. |
| 9 | 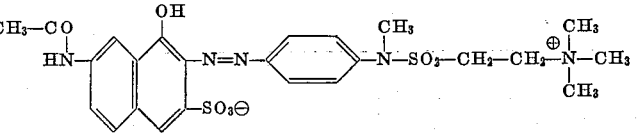 | Scarlet. |
| 10 | 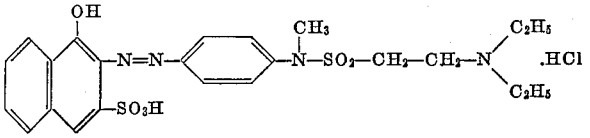 | Orange. |

Example 11

26 parts of 1-(N-methyl-β-dimethylamino-ethylsulfonylamino)-3-aminobenzene of the formula

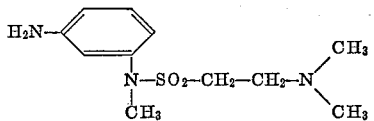

are diazotized in dilute hydrochloric acid with sodium nitrite; when the diazotization is complete, the solution is neutralized with sodium bicarbonate. The diazonium salt solution obtained is then combined with a solution of 56 parts of 1-naphthol-3,6-disulfonic acid of 55% strength in 200 parts by volume of water. After the coupling, the dyestuff is isolated and dried at about 40° C. A red-brown powder is obtained which dissolves in water to give an orange-red solution.

The dyestuff can be worked up in usual manner with thickening agents and with the addition of sodium bicarbonate to a printing paste which, when applied to cotton and after having heated the printed fabric for a short time at a temperature of about 100° to 102° C. and rinsed with hot water, yields a clear reddish orange print possessing a very good fastness to wet processing. A dyestuff having similar properties is obtained when using as diazo compound a compound of the formula

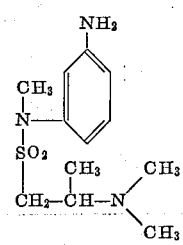

The 1-(N-methyl-β-dimethylamino-ethylsulfonylamino)-3-aminobenzene used for preparing the dyestuff can be prepared, for example, according to the following process:

287 parts of 1-(N-methyl-β-dimethylamino-ethylsulfonylamino)-3-nitrobenzene (obtainable by reacting 3-nitro-1-methylaminobenzene with carbyl sulfate and then with dimethylamine) are dissolved in the heat in 995 parts of alcohol and reduced at about 20° to 30° C. and at a hydrogen pressure of 30 atmospheres gauge pressure in the presence of 20 parts of Raney nickel. When the reduction is complete, the solution is filtered and evaporated in vacuo to dryness. After having recrystallized the residue from butanol, the product is obtained in the form of colorless crystals which melt at 92° C. to 93° C.

Example 12

42 parts of the aniline derivative of the formula

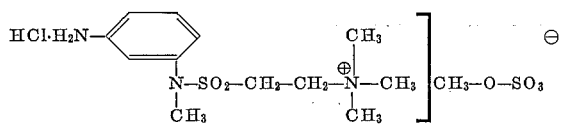

obtainable by catalytic reduction of 1-(N-methylsulfonyl-amino - 3' - nitrophenyl) - ethane-2-trimethyl-ammonium-methylsulfate and neutralization with hydrochloric acid, are diazotized with sodium nitrite as described in Example 2 and combined with a solution of 1-naphthol-3,6-disulfonic acid. When the coupling is complete, the dyestuff formed is precipitated by adding potassium chloride, filtered off and dried in vacuo at about 40° C.

A dark-colored powder is obtained which dissolves easily in water to give an orange-red solution. On cotton or regenerated cellulose there are obtained with printing pastes thickened with alginate and the addition of alkalis, such as soduim bicarbonate, sodium carbonate, trisodium phosphate or sodium hydroxide solution clear reddish-orange prints possessing a very good fastness to wet processing.

In an analogous manner there are obtained the dyestuffs listed in the following table; on cellulose materials they yield dyeings and prints which possess a good fastness to light.

| Example | Dyestuff | Tint on cotton |
|---|---|---|
| 13 | $CH_3-CO-NH$ structure with naphthol-azo-phenyl-$N-SO_2-CH_2-CH_2-N(CH_3)_3^\oplus$ | Bluish-red. |
| 14 | $Cl-CH_2-CO-NH$ structure with naphthol-azo-phenyl-$N-SO_2-CH_2-CH_2-N(CH_3)_3^\oplus$ | Bluish-red. |
| 15 | Naphthol-azo-phenyl-$N-SO_2-CH_2-CH_2-N(CH_3)_3^\oplus$ | Red. |
| 16 | Phenyl-azo-naphthol structure with $N-CH_3$, $SO_2-CH_2-CH_2-N(CH_3)_3^\oplus$ | Orange. |
| 17 | $C_6H_5-CO-NH$ naphthol-disulfonic-azo-phenyl-$N-SO_2-CH_2-CH_2-N(C_2H_5)_2-CH_2-CH_2-CH_3$ | Red. |
| 18 | HOOC-pyrazolone-azo-phenyl-$N-SO_2-CH_2-CH_2-N(CH_3)_3^\oplus$ | Greenish yellow. |
| 19 | $H_2N-CO-NH$ naphthol-azo-phenyl-$N-SO_2-CH_2-CH_2-N(CH_3)_2$ | Orange. |

| Example | Dyestuff | Tint on cotton |
|---|---|---|
| 20 | (structure) | Brown. |
| 21 | (structure) | Orange. |
| 22 | (structure) | Black. |
| 23 | (structure) | Clear yellow. |
| 24 | (structure) | Bluish-red. |
| 25 | (structure) | Yellow. |
| 26 | (structure) | Yellow. |

| Example | Dyestuff | Tint on cotton |
|---|---|---|
| 27 | ![structure with CF3, OH, NH2, CF3, azo groups, HO3S, SO3H, CH3-N, SO2-CH2-CH2-N(CH3)2, N-CH3, SO2-CH2-CH2-N(CH3)-CH3] | Black. |
| 28 | ![structure with SO3H, OH, azo, HO3S, N-SO2-CH2-CH2-N(C2H5)2, CH3] | Orange. |
| 29 | ![structure with N=N, COOH, HO, N, CH3-N-SO2-CH2-CH2-N⊕(CH3)3, CO3⊖] | Yellow. |
| 30 | ![structure with O-Cu-O, NH-CO-CH3, N=N, HO3S, SO3H, CH3-N, SO2-CH2-CH2-N(C2H5)2] | Violet. |
| 31 | ![structure with OH, N=N, HO3S, N-SO2-CH2-CH2-N(CH3)2, CH3-N, SO2-CH2-CH2-N(CH3)-CH3] | Orange. |

Example 32

39 parts of the aniline derivative of the formula

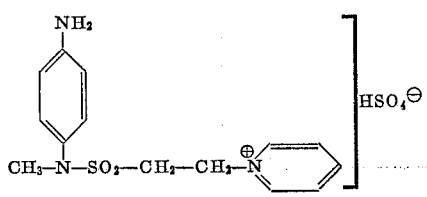    HSO$_4^\ominus$ obtainable by the reaction of the potassium salt of 1-(N-methyl-ethionylamino)-4-aminobenzene and pyridine are diazotized as described in Example 2 and combined with a solution of 1-naphthol-3,6-disulfonic acid. When the coupling is complete, the dyestuff is precipitated with sodium salt, filtered off and dried. A dark powder which is easily soluble in water, is obtained; on cotton it yields in the presence of sodium bicarbonate and after steaming a scarlet print which possesses a good fastness to light and to wet processing.

When using 1 - acetylamino-8-naphthol-3,6-disulfonic acid instead of 1-naphthol-3,6-disulfonic acid, a dyestuff of the formula

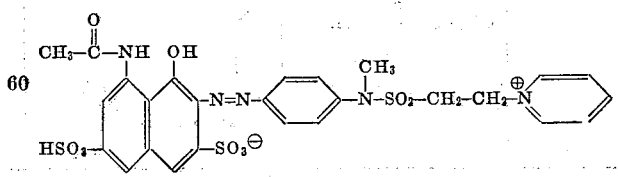

is obtained.

The dyestuff powder which dissolves easily in water to give a red solution yields on cotton in the presence of an acid-binding agent a brilliant bluish red print possessing good to very fastness properties.

We claim:
1. A compound of the formula

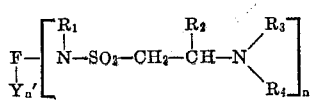

or

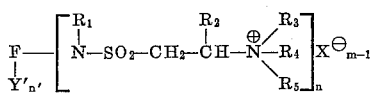

wherein F represents a monoazo or disazo dyestuff molecule containing at least one benzene ring and one naphthol or pyrazolone group; the group shown within the brackets being connected to a benzene ring or naphthol group of said dyestuff molecule directly or by means of methylene, $R_1$ and $R_2$ represent hydrogen or lower alkyl, $R_3$, $R_4$ and $R_5$ taken alone represent hydrogen, methyl, ethyl or phenyl, $R_3$ and $R_4$ taken together represent pentamethylene, $R_3$, $R_4$ and $R_5$ taken together with the nitrogen atom represent pyridinium, $X^\ominus$ represents chlorine, hydrogen sulfate or methosulfate, Y represents —$SO_3H$ or —COOH, Y' represents —$SO_3H$, —$SO_3^\ominus$, —COOH or $COO^\ominus$, $n$ represents 1 to 3, $n'$ represents 0 to 3 and $m$ represents 1 to 4.

2. The compound of the formula

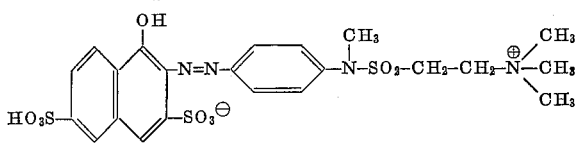

3. The compound of the formula

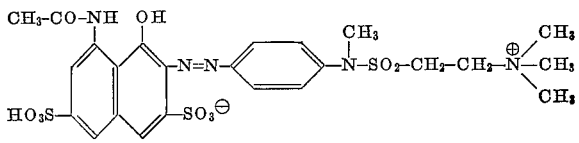

4. The compound of the formula

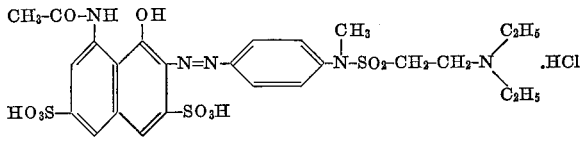

5. The compound of the formula

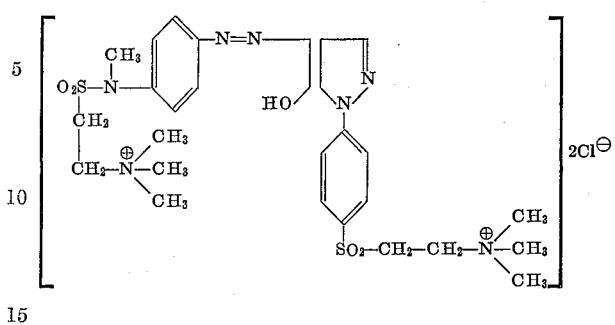

6. The compound of the formula

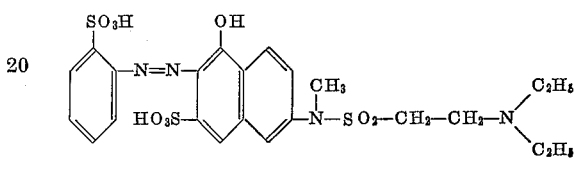

References Cited

UNITED STATES PATENTS

| | | | |
|---|---|---|---|
| 3,057,845 | 10/1962 | Liechti et al. | 260—151 XR |
| 3,201,383 | 8/1965 | Straley et al. | 260—163 |

FOREIGN PATENTS

| | | |
|---|---|---|
| 659,734 | 2/1929 | France. |
| 1,263,438 | 5/1961 | France. |
| 1,267,509 | 6/1961 | France. |

CHARLES B. PARKER, *Primary Examiner.*

F. D. HIGEL, *Assistant Examiner.*